US012802458B2

(12) United States Patent
Han et al.

(10) Patent No.: US 12,802,458 B2
(45) Date of Patent: Nov. 17, 2026

(54) APPARATUS AND METHOD FOR CONTROLLING A VEHICLE

(71) Applicants: HYUNDAI MOTOR COMPANY, Seoul (KR); KIA CORPORATION, Seoul (KR)

(72) Inventors: Ji Hee Han, Seoul (KR); Jung Phil Kwon, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 275 days.

(21) Appl. No.: 18/602,282

(22) Filed: Mar. 12, 2024

(65) Prior Publication Data

US 2025/0148799 A1 May 8, 2025

(30) Foreign Application Priority Data

Nov. 6, 2023 (KR) ........................ 10-2023-0151993

(51) Int. Cl.
*G06V 20/58* (2022.01)
*G06T 7/70* (2017.01)

(52) U.S. Cl.
CPC ................ *G06V 20/58* (2022.01); *G06T 7/70* (2017.01)

(58) Field of Classification Search
CPC .... G06V 20/58; G06V 2201/08; G06V 10/44; G06V 10/776; G06V 20/588; G06T 7/70; G06T 2207/30252; G06T 7/246; G06T 7/277; G06T 7/292; G06T 7/60; G06T 2210/12; B60W 40/02; B60W 2420/403; B60W 2554/4049
See application file for complete search history.

(56) References Cited

U.S. PATENT DOCUMENTS

| | | | | |
|---|---|---|---|---|
| 11,740,905 | B1 * | 8/2023 | Kudli | G06N 5/022 712/226 |
| 2019/0286940 | A1 * | 9/2019 | Shen | G06N 3/08 |
| 2021/0042548 | A1 * | 2/2021 | Luo | G06V 40/171 |
| 2021/0224560 | A1 * | 7/2021 | Kim | G06V 10/764 |
| 2022/0083636 | A1 * | 3/2022 | Sarkis | G06F 21/32 |
| 2022/0289239 | A1 * | 9/2022 | Shenfeld | G01C 21/3811 |
| 2024/0065667 | A1 * | 2/2024 | Jatautas | A61B 8/0858 |

FOREIGN PATENT DOCUMENTS

| | | | | |
|---|---|---|---|---|
| CA | 3215397 A1 | * | 10/2022 | G06N 3/045 |
| CN | 109492581 A | * | 3/2019 | G06F 18/2411 |

* cited by examiner

*Primary Examiner* — Qun Shen
(74) *Attorney, Agent, or Firm* — Lempia Summerfield Katz LLC

(57) ABSTRACT

An apparatus for controlling a vehicle includes a sensor having at least one camera to obtain information about objects positioned around the vehicle. The apparatus also includes a controller configured to detect at least one object image from an image obtained from the camera. The controller predicts a position of each object on the image currently obtained, based on information about objects recognized from an image previously obtained. The controller recognizes an object by analyzing correlation between two objects based on an object image detected at the predicted position and an object image previously recognized.

20 Claims, 10 Drawing Sheets

APPARATUS AND METHOD FOR CONTROLLING A VEHICLE

CROSS-REFERENCE TO RELATED APPLICATION

This application claims the benefit of and priority to Korean Patent Application No. 10-2023-0151993, filed in the Korean Intellectual Property Office on Nov. 6, 2023, the entire contents of which are incorporated herein by reference.

TECHNICAL FIELD

The present disclosure relates to an apparatus and a method for controlling a vehicle.

BACKGROUND

An autonomous driving system of a vehicle requires a technology for exactly recognizing a surrounding environment (i.e., a surrounding object) of the vehicle. Accordingly, the vehicle may include various sensors, such as a camera, a radar, and/or a Lidar. In addition, a technology for detecting, tracking, and/or classifying surrounding objects of the vehicle, based on sensor data obtained through the sensor has been applied to the vehicle.

Conventionally, to track an object, there has been employed a technology for generating a rectangular box (or an object box) corresponding to an object, based on Lidar data (i.e., point data) received through a Lidar, generating a track including an estimated position value of the object, based on the object box, and thus tracking the object.

In addition, conventionally, a scheme for tracking an object using a camera is to compare a shape of an object in a previous image and a shape of an object in a present image, recognize the object in the previous image and the object in the present image as a same object based on similarity, and track the same object by linking the object in the previous image with the object in the present image.

However, according to the scheme for tracking the object using the conventional camera, when the object tracked is hidden by another object, the shape of the object is changed in the image. Accordingly, the same object is erroneously recognized as another object, such that the object fails to be exactly tracked.

SUMMARY

The present disclosure has been made to solve the above-mentioned problems occurring in the prior art while advantages achieved by the prior art are maintained intact.

Aspects of the present disclosure provide an apparatus and a method for controlling a vehicle. The apparatus and the method may divide a rear surface image (front surface image) and a side surface image of the object. The apparatus and the method may also calculate the reliability for the rear surface image (the front surface image), when recognizing the object based on an image of the object captured by a camera. The apparatus and the method may also analyze the correlation between the objects, based on feature values of a reliable image. Thus, the recognition rate of the same object may be increased, and the performance for tracking the object may be improved.

Other aspects of the present disclosure provide an apparatus and a method for controlling a vehicle capable of learning. The apparatus and the method may learn object recognition data for a rear surface image (a front surface image) and a side surface image of the object. The apparatus and the method may also analyze the correlation between objects by making reference to learning data, when recognizing an unreliable image to minimize the erroneous recognition of the object.

The technical problems to be solved by the present disclosure are not limited to the aforementioned problems. Any other technical problems not mentioned herein should be clearly understood from the following description by those having ordinary skill in the art to which the present disclosure pertains.

According to an embodiment of the present disclosure, an apparatus for controlling a vehicle includes a sensor having at least one camera to obtain information about objects positioned around the vehicle. The apparatus also includes a controller configured to detect at least one object image from an image obtained from the camera. The controller predicts a position of each object on the image currently obtained, based on information about objects recognized from an image previously obtained. The controller recognizes an object by analyzing correlation between two objects based on an object image detected at the predicted position and an object image previously recognized. The controller extracts a first image, which corresponds to a front surface or a rear surface, of the object image, and extracts a second image, which corresponds to a side surface. The controller analyzes the correlation between the two objects by comparing a feature value of the first image and a feature value of the second image, with a feature value of a third image corresponding to the front surface or the rear surface and a feature value of a fourth image, respectively. The third image and the fourth image may be extracted from the object image previously recognized.

According to an embodiment, the controller calculates a distance value between the feature value of the first image and the feature value of the third image. The controller calculates a distance value between the feature value of the second image and the feature value of the fourth image. The controller analyzes the correlation between the two objects, based on the calculated distance value.

According to an embodiment, the controller calculates a Mahalanobis distance between the feature values and analyzes the correlation between the two objects.

According to an embodiment, the controller calculates a cosine distance between the feature values and analyzes the correlation between the two objects.

According to an embodiment, the controller calculates a proportion of a region, which is occupied by each of the first image and the second image, in a bounding box, which is defined as a rectangular region including the object image, based on the bounding box. The controller analyzes reliability for each of the first image and the second image, based on the calculated proportion.

According to an embodiment, the controller analyzes the correlation between the two objects, based on a feature value of at least one of the first image and the second image, in response to a determination that reliability of the at least one of the first image or the second image exceeds a reference value.

According to an embodiment, the controller analyzes the correlation between the two objects, based on a distance value calculated based on a distance matrix of learning data, which is previously learned, when reliability for at least one of the first image or the second image is equal to or less than a reference value.

According to an embodiment, the controller calculates reliability for a front surface image or a rear surface image and for a side surface image detected from one image of images input from at least two cameras. The controller calculates reliability for a front surface image or a rear surface image, and for a side surface image detected from another image of the images input from the at least two cameras, when the images are input from the at least two cameras. The controller analyzes the correlation between the objects in the two images, based on a weighted sum calculated based on the calculated reliability.

According to an embodiment, the controller analyzes the correlation between the two objects, based on the first image and the second image. The controller learns an operation for recognizing the same object. The controller recognizes the object by reflecting learning data in inputting a next image from the camera.

According to an embodiment, the controller allocates a tracking identity (ID) to an object recognized from the object image. The tacking ID is the same as a tracking ID of an object previously recognized, when the object recognized from the object image has the correlation with the object previously recognized.

According to an embodiment, a method for controlling a vehicle includes obtaining an image about objects positioned around the vehicle from at least one camera. The method also includes detecting at least one object image from the image obtained to predict a position of each object on a present image currently obtained, based on information about objects recognized from an image previously obtained. The method also includes recognizing an object by analyzing correlation between two objects based on an object image detected at the predicted position and an object image previously recognized. Recognizing the object includes extracting a first image, which corresponds to a front surface or a rear surface, of the object image, and extracting a second image, which corresponds to a side surface. Recognizing the object also includes analyzing the correlation between the two objects by comparing a feature value of the first image and a feature value of the second image with a feature value of a third image corresponding to the front surface or the rear surface and a feature value of a fourth image, respectively. The third image and the fourth image are extracted from the object image previously recognized.

According to an embodiment, analyzing the correlation between the two objects includes calculating a distance value between the feature value of the first image and the feature value of the third image. Analyzing the correlation between the two objects also includes a distance value between the feature value of the second image and the feature value of the fourth image. Analyzing the correlation between the two objects also includes analyzing the correlation between the two objects, based on the calculated distance values.

According to an embodiment, analyzing the correlation between the two objects includes calculating a Mahalanobis distance between the feature values.

According to an embodiment, analyzing the correlation between the two objects includes calculating a cosine distance between the feature values.

According to an embodiment, analyzing the correlation between the two objects includes calculating a proportion of a region, which is occupied by each of the first image and the second image, in a bounding box, which is defined as a rectangular region including the object image, based on the bounding box. Analyzing the correlation between the two objects also includes analyzing reliability for each of the first image and the second image, based on the calculated proportion.

According to an embodiment, analyzing the correlation between the two objects includes calculating a proportion of a region, which is occupied by each of the first image and the second image, in a bounding box, which is defined as a rectangular region including the object image, based on the bounding box. Analyzing the correlation between the two objects also includes analyzing reliability for each of the first image and the second image, based on the calculated proportion.

According to an embodiment, analyzing the correlation between the two objects includes analyzing the correlation between the two objects, based on a feature value of at least one of the first image or the second image, in response to a determination that reliability of the at least one of the first image or the second image exceeds a reference value.

According to an embodiment, analyzing the correlation between the two objects includes analyzing the correlation between the two objects, based on a distance value calculated based on a distance matrix of learning data, which is previously learned, when reliability for at least one of the first image or the second image is equal to or less than a reference value.

According to an embodiment, recognizing the object includes calculating reliability for a front surface image or a rear surface image and for a side surface image detected from from at least two cameras one image of images input Recognizing the object also includes calculating reliability for a front surface image or a rear surface image, and a side surface image detected from another image of the images input from the at least two cameras, when the images are input from the at least two cameras. Recognizing the object also includes calculating analyzing the correlation between the two objects in the two images, based on a weighted sum calculated based on the calculated reliability.

According to an embodiment, recognizing the object further includes allocating a tracking identity (ID) to an object recognized from the object image. The tacking ID is the same as a tracking ID of an object previously recognized, when the object recognized from the object image has the correlation with the object previously recognized.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
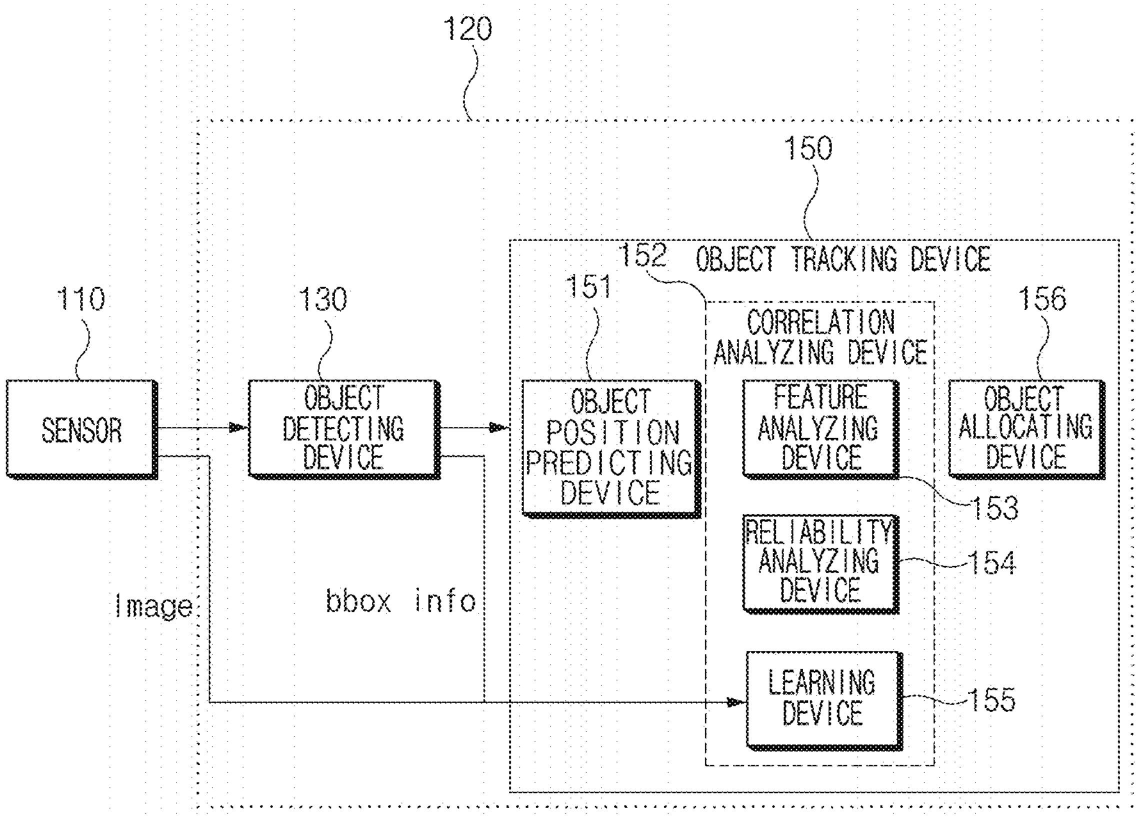
FIG. 1 is a block diagram illustrating the configuration of an apparatus for controlling a vehicle, according to an embodiment of the present disclosure.

Hereinafter, some embodiments of the present disclosure are described in detail with reference to accompanying drawings. In adding the reference numerals to the components of each drawing, it should be noted that the identical or equivalent components are designated by the identical numerals even when the components are displayed on other drawings. Further, in the present disclosure, a describing the embodiments of detailed description of well-known features or functions has been omitted in order not to unnecessarily obscure the gist of the present disclosure.

In addition, in the following description of components according to embodiments of the present disclosure, the terms 'first', 'second', 'A', 'B', '(a)', and '(b)' may be used. The terms are used only to distinguish relevant components from other components, and the nature, the order, or the sequence of the relevant components is not limited to the terms. In addition, unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings consistent with the contextual meanings in the relevant field of art. The terms should not be interpreted as having ideal or excessively formal meanings unless clearly defined as having such in the present application. When a component, device, element, or the like of the present disclosure is described as having a purpose or performing an operation, function, or the like, the component, device, element, or the like should be considered herein as being "configured to" meet that purpose or to perform that operation or function. Each component, device, element, and the like may separately embody or be included with a processor and a memory, such as a non-transitory computer readable media, as part of the apparatus.

Hereinafter, embodiments of the present disclosure are described in detail with reference to FIGS. 1-8.

FIG. 1 is a view illustrating the configuration of an apparatus (hereinafter, a vehicle control apparatus) for controlling a vehicle, according to an embodiment of the present disclosure. FIGS. 2, 3, 4A, 4B, 4C, 5, and 6 are views illustrating an object tracking operation in an apparatus for controlling a vehicle, according to an embodiment of the present disclosure.

Referring to FIG. 1, according to an embodiment of the present disclosure, the vehicle control apparatus may be implemented inside a vehicle. In this case, the vehicle control apparatus may be formed integrally with the internal control units of the vehicle or may be implemented separately from the internal control units of the vehicle configured to be connected to the internal control units of the vehicle through a separate connector.

According to an embodiment of the present disclosure, the vehicle control apparatus may include a sensor 110 and a controller 120.

The sensor 110 may include at least one sensor to obtain information (for example, information about surrounding vehicles) about objects positioned around a vehicle. In this case, the sensor 110 may include a camera. For example, the camera may be a surround view monitoring (SVM) camera, but the present disclosure is not limited thereto. The SVM camera may include a front view camera, a rear view camera, a left view camera, and a right view camera. Each camera may be tuned to be applied to the SVM system to capture the optimal SVM image.

In addition, the sensor 110 may further include sensors to obtain information about objects positioned around the vehicle in another scheme.

The controller 120 may be connected to each component of the vehicle control apparatus to perform the overall function of the vehicle control apparatus. In this case, the controller 120 may be a hardware device, such as a processor or a central processing unit (CPU), or a program implemented by a processor.

The controller 120 may detect an object from the image obtained from the camera, track the detected object, and analyze the correlation between objects detected from image frames consecutively obtained. Thus, the controller 120 may consecutively recognize the same object based on the result, such that the object is accurately tracked.

In this case, the controller 120 may include an object detecting device 130 and an object tracking device 150.

The object detecting device 130 analyzes an image obtained from the camera, when receiving the image from the camera, and detects an object included in the image. In this case, the object detecting device 130 may detect a plurality of objects included in the image. The object detecting device 130 may provide, to the object tracking device 150, information about at least one object detected from the image, when detecting the information about at least one object detected from the image. The object detecting device 130 may detect information about an object in every image frame consecutively obtained from the camera and may provide, to the object tracking device 150, the detection result.

In this case, the object detecting device 130 may extract information about a bounding box (BBox), which is obtained by defining a region having each object in the image as a rectangular region, and may provide the extraction result to the object tracking device 150.

The object tracking device 150 may recognize an object in the image, based on the information about the object detected by the object detecting device 130, recognize an object in each of image frames, which are consecutively provided, and track the motion of the relevant object.

The object tracking device 150 may analyze the reliability for the image of the object detected by the object detecting device 130 to improve the accuracy of the recognition of the same object. The object tracking device 150 may also analyze the correlation between the objects, based on the information about the object, which is consecutively detected, and learning data. Thus, the object tracking device 150 may recognize and track the same object.

In this case, the object tracking device 150 may include an object position predicting device 151, a correlation analyzing device 152, and an object allocating device 156.

The object position predicting device 151 predicts the position of an object, which is previously recognized, in a present image frame, based on the information about the object detected until the previous image frame.

For example, the object position predicting device 151 may predict the position of the same object in the present image frame by using a Kalman filter algorithm. The Kalman filter algorithm is an algorithm to track the optimal value, through recursive computation based on a previous value and a present value. The Kalman filter algorithm may predict, with probability, a present position of the relevant object in the present image frame by using object information detected from a previous image frame.

The object position predicting device 151 provides, to the correlation analyzing device 152, a result obtained by predicting the position of at least one object, which is previously recognized, in the present image frame.

The correlation analyzing device 152 may match the information about the object, which is detected at a position predicted by the object position predicting device 151, with information of an object, which is previously learned, to analyze the correlation between the two objects. In this case, when the correlation between the objects is analyzed, the correlation may be analyzed based on a feature value in a bounding box for each object.

For example, the correlation analyzing device 152 may analyze the reliability for a rear surface image (or a front surface image) and a side surface image of an object included in the bounding box for each object. The correlation analyzing device 152 may also analyze the feature of each image, based on the reliability for each of the rear surface image (or front surface image) and a side surface image of each object. However, although the following description is made while focusing on the analysis of the feature from the rear surface image and the side surface image, the present disclosure is not limited thereto. According to an embodiment, the operation may be performed based on the front surface image and the side surface image, instead of the rear surface image according to an embodiment.

In detail, the correlation analyzing device 152 may include a feature analyzing device 153, a reliability analyzing device 154, and a learning device 155.

The feature analyzing device 153 crops the rear surface image and the side surface image from the image of the object detected from the object detecting device 130. The feature analyzing device 153 analyzes the feature of the rear surface image and the feature of the side surface image, based on the reliability for the rear surface image and the side surface image which are cropped.

The reliability for the rear surface image and the side surface image of the object may be determined by the reliability analyzing device 154. The reliability analyzing device 154 may calculate a proportion occupied by a region for the rear surface image and a proportion occupied by a region for the side surface image, based on the bounding box for the relevant object extracted from the object detecting device 130. In this case, because the overlap region between the rear surface image and the bounding box and between the side surface image and the bounding box is increased, the reliability for each of the rear surface image and the side surface image may be increased.

For example, the reliability analyzing device 154 may determine the reliability, based on an intersection over union (IOU) obtained by quantifying the overlap region between the two regions. In this case, the IOU may refer to a value obtained by representing the overlap region between the bounding box and the region for the rear surface image or the overlap region between the bounding box and the region for the side surface image, as a value ranging from '1' to '0'.

Figure 3:
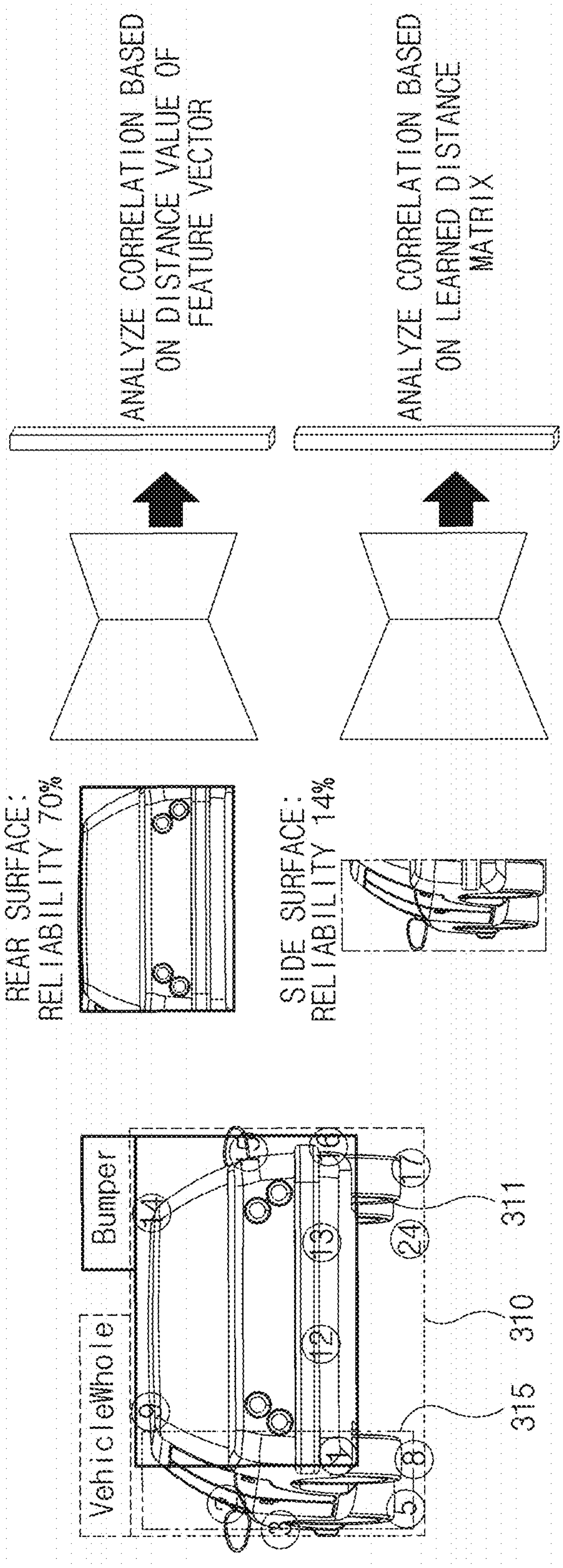

Referring to FIG. 3, reference numeral 310 may indicate the bounding box for the whole region of the object (vehicle), reference numeral 311 may indicate the rear surface image region of the object in the bounding box, and reference numeral 315 may indicate a side surface image region of the object in the bounding box.

In this case, the reliability analyzing device 154 may determine the reliability for the rear surface image as being high, when the proportion occupied by the region for the rear surface image in the bounding box is high. For example, the reliability analyzing device 154 may calculate the proportion occupied by the region for the rear surface image of the object in the bounding box of FIG. 3 and may determine the reliability for the rear surface image of the object as being 70%.

As describe above, when the reliability for the rear surface image of the object exceeds a preset reference value, the feature analyzing device 153 may calculate the distance value of a feature vector included in the rear surface image of the object and may analyze the correlation between the objects, based on the calculated distance value of the feature vector.

Meanwhile, the reliability analyzing device 154 may determine the reliability for the side surface image as being low, when the proportion occupied by the side surface image region in the bounding box is low. For example, the reliability analyzing device 154 may calculate the proportion occupied by the side surface image region of the object in the bounding box of FIG. 3 and may determine the reliability for the side surface image of the object as being 148. When the rear surface image or the side surface image of the object is hidden by another object and fails to be recognized, the reliability analyzing device 154 may calculate the reliability based on a confidence score learned by the learning device 155.

When the reliability for the side surface image of the object is equal to or less than a preset reference value, the feature analyzing device 153 may not determine the feature vector included in the side surface image as being reliable and may not utilize the side surface image in analyzing the correlation. In this case, the feature analyzing device 153 may analyze the correlation between objects, based on a distance matrix previously learned in the learning device 155.

In this case, the learning device 155 may learn the object recognition data, based on data about an image having reliability exceeding the reference value. In this case, the learning device 155 may learn the object recognition data through a deep learning model. In this case, the learned data may be reflected in recognizing the object from a next image frame.

Figure 2:
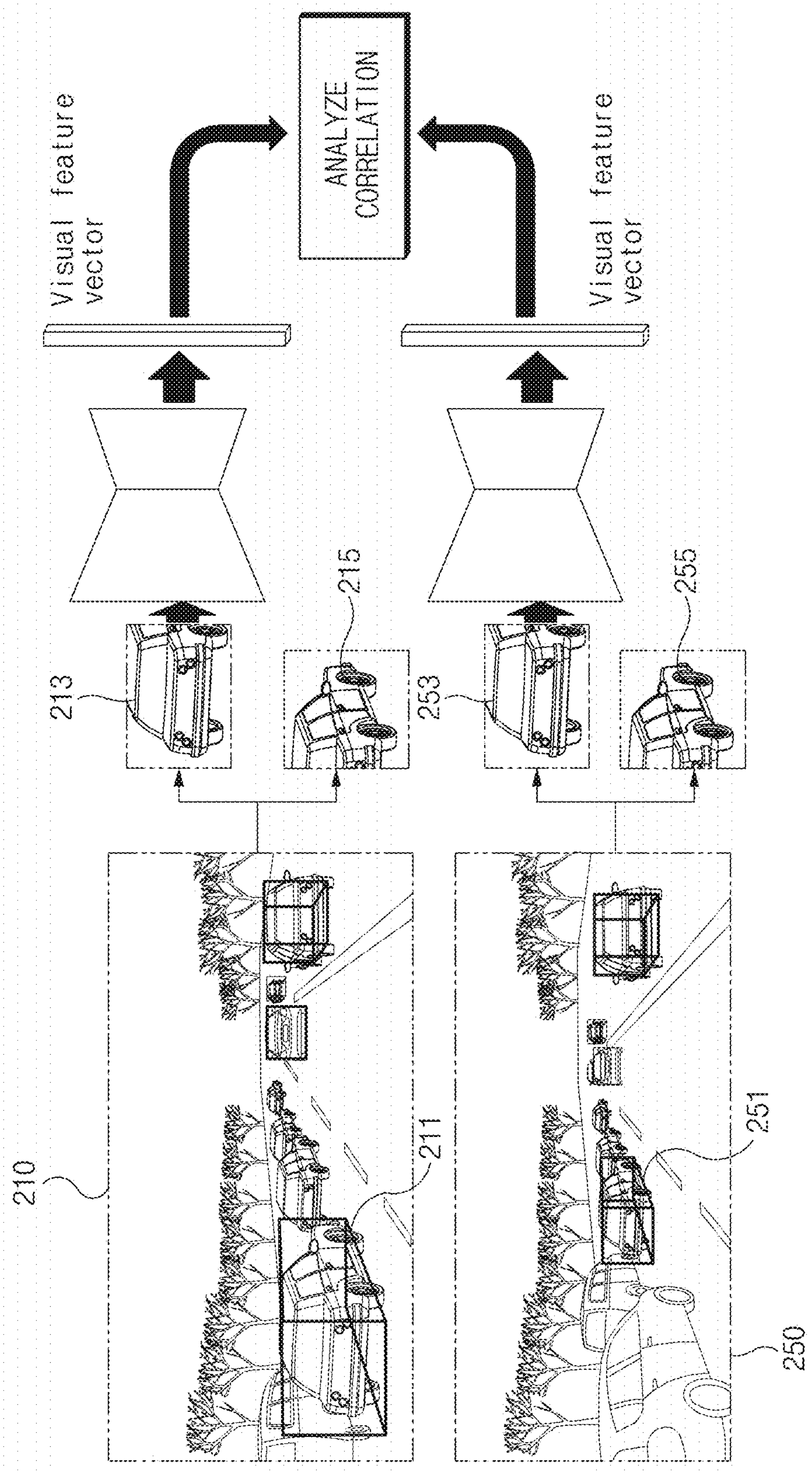
FIGS. 2 and 3 are views illustrating an object recognizing operation, according to an embodiment of the present disclosure.

Referring to FIG. 2, the feature analyzing device 153 may compare feature vectors of a rear surface image 213 and a side surface image 215 extracted from a bounding box 211 of the object recognized from a previous image frame 210, with feature vectors of a rear surface image 253 and a side surface image 255 extracted from a bounding box 251 of the same object, which is recognized from a present image frame 250. The feature analyzing device 153 may also analyze the comparison and may analyze the correlation between two objects.

In this case, the feature analyzing device 153 may compare the rear surface image 213 of the object, which is recognized from the previous image frame 210, with the rear surface image 253 of the object, which is recognized from the present image frame 250, to analyze features included in the rear surface image of the object. In this case, the feature analyzing device 153 may analyze the correlation between two objects by calculating the distance based on features (i.e., the correlation between the pixels) extracted from two rear surface images.

In this case, the feature analyzing device 153 may compare the side surface image 215 of the object, which is recognized from the previous image frame 210, with the side surface image 255 of the object, which is recognized from the present image frame 250, to analyze features included in the side surface image of the object. In this case, the feature analyzing device 153 may analyze the correlation between two objects by calculating the distance based on features (i.e., the correlation between the pixels) extracted from two side surface images.

For example, the feature analyzing device 153 may analyze the correlation between two objects by calculating the Mahalanobis distance between features (i.e., pixels) extracted from the two images to analyze the correlation between the two objects.

For another example, the feature analyzing device 153 may analyze the correlation between two objects by calculating a cosine distance between feature vectors extracted from the two images.

In this case, the feature analyzing device 153 may calculate the distance value based on the correlation, based on the feature values having reliability exceeding the reference value.

The learning device 155 learns data extracted in a process of recognizing and tracking an object from an image frame. In this case, the learning device 155 may learn object recognition data based on the feature values having the reliability exceeding the reference value, among the features extracted from the object, and may store learning data. The learning data of the learning device 155 may be utilized to recognize the object from a next image frame.

Figure 6:
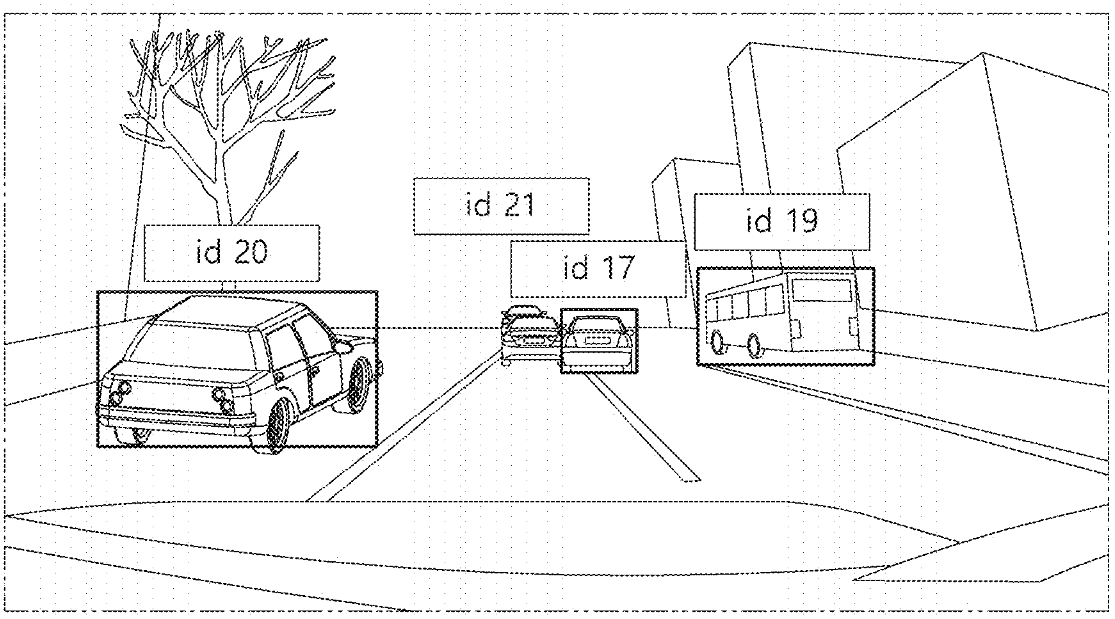
FIG. 6 is a view illustrating an object recognizing result, according to an embodiment of the present disclosure.

The object allocating device 156 identifies information of each object having higher correlation, based on the analysis result of the correlation between the objects, from the feature analyzing device 153, the reliability analyzing device 154, and the learning device 155. As illustrated in FIG. 6, the object allocating device 156 may allocate tracking ID for tracking an object to each object. When the object has a higher correlation with an object previously recognized, the same tracking ID may be allocated to the object, such that the object is recognized as the same as the object previously recognized.

Accordingly, the object tracking device 150 may track the object based on the tracking ID allocated by the object allocating device 156. Thus, the accuracy in tracking objects consecutively detected may be improved.

Meanwhile, the object tracking device 150 may analyze the correlation between objects detected from the plurality of images captured by multiple cameras. The details thereof should be understood by making reference to the description made with reference to FIGS. 4A, 4B, 4C, and 5.

Figure 4A:
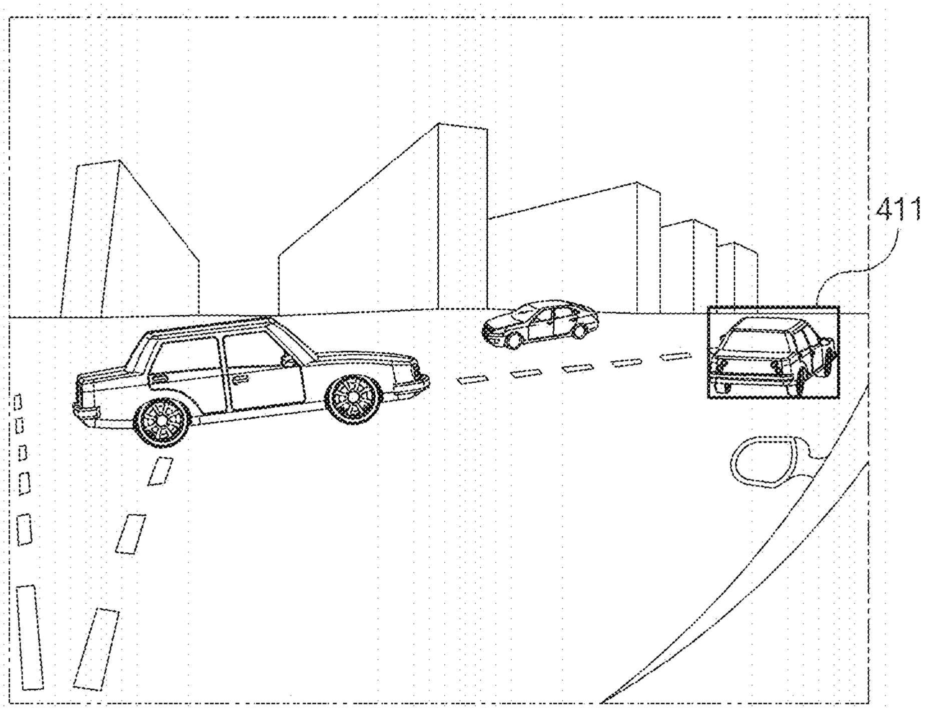
FIGS. 4A, 4B, 4C, and 5 are views illustrating an object recognizing operation, according to an embodiment of the present disclosure.
Figure 4B:
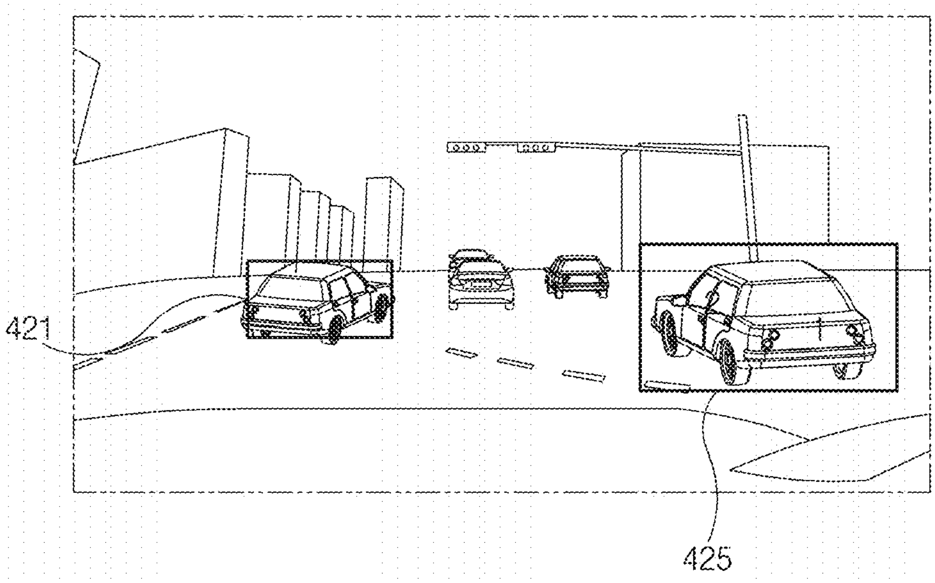
Figure 4C:
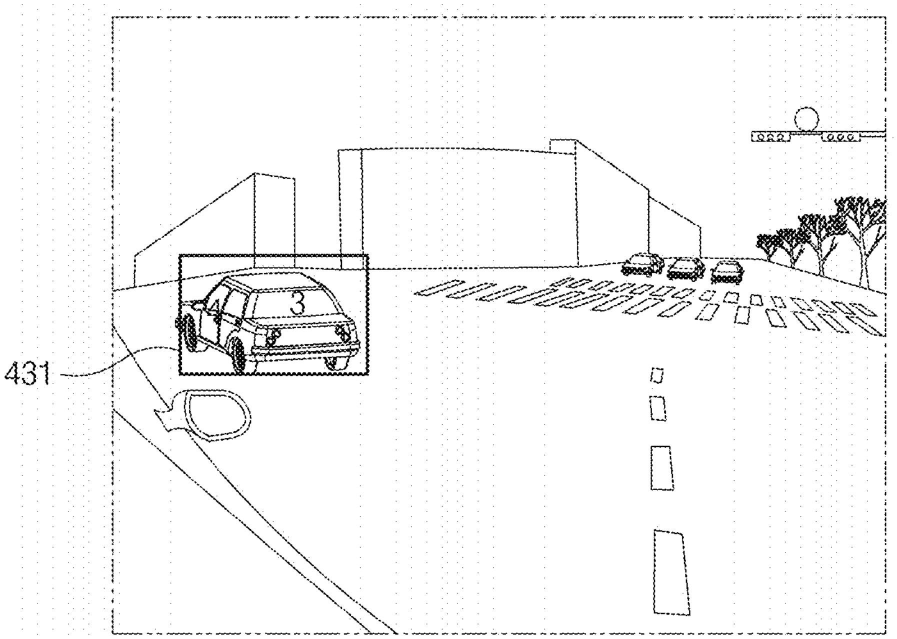

First, FIG. 4A illustrates a first image obtained from the left view camera provided at a left side of the vehicle. FIG. 4B illustrates a second image obtained from the front view camera provided in a front portion of the vehicle. FIG. 4C is a view illustrating a third image obtained from the right view camera provided at the right side of the vehicle.

The object tracking device 150 may recognize that an object 411 detected from the first image and an object 421 detected from the second image are the same object and may recognize that an object 425 detected from the second image and an object 431 detected from the third image are the same object.

In this case, the object tracking device 150 may analyze the correlation between the objects recognized from mutually different images. The object tracking device 150 may determine the objects as being the same object when the objects have a higher correlation. The object tracking device 150 may track the relevant object based on the allocated tracking ID.

Figure 5:
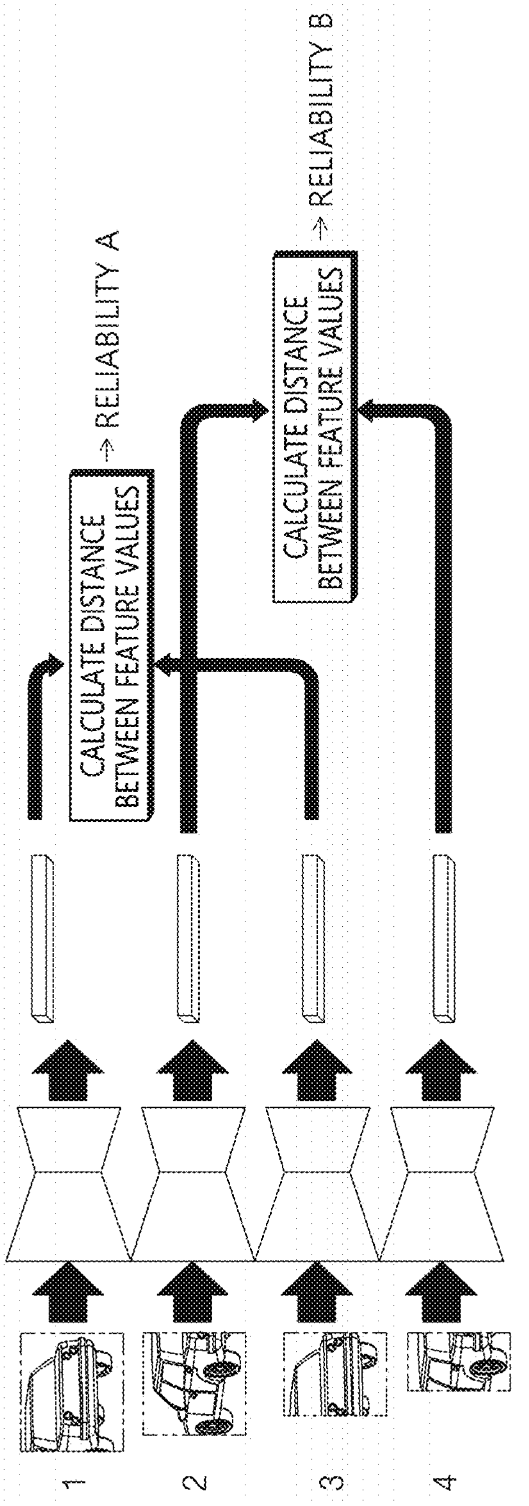

In this case, the operation of analyzing the correlation between the object 425 detected from the second image and the object 431 detected from the third image may be understood by making reference to the description made with reference to FIG. 5. According to an embodiment referring to FIG. 5, it is assumed that the rear surface image and the side surface image of the object 425 detected from the second image has reliability exceeding the reference value, and the rear surface image and the side surface image of the object 431 detected from the third image has reliability exceeding the reference value.

Referring to FIG. 5, the object tracking device 150 may calculate the distance between features values of the rear surface image of the object 425, which is detected from the second image, and feature values of the rear surface image of the object 431 detected from the third image. The object tracking device 150 may also analyze the correlation between two objects, based on the calculated distance value. In this case, the object tracking device 150 may calculate the distance between features by applying a weight given based on the reliability (a) of the rear surface image of the object 425 detected from the second image and the rear surface image detected from the third image Similarly, the object tracking device 150 may calculate the distance between features values of the side surface image of the object 425, which is detected from the second image, and feature values of the side surface image of the object 431 detected from the third image. The object tracking device 150 may also analyze the correlation between two objects, based on the calculated distance value. In this case, the object tracking device 150 may calculate the distance between features values of the side surface image of the object 425, which is detected from the second image, and feature values of the side surface image of the object 431 detected from the third image. The object tracking device 150 may also analyze the correlation between two objects, based on the calculated distance value.

In this case, because the features are all reliable with respect to the rear surface image and the side surface image of the relevant object, the object tracking device 150 may calculate the distance (d) between the objects through the sum of weights based on reliability.

$$d = a*V1 + b*V2 \quad \text{Equation 1}$$

In Equation 1, "d" denotes the distance between the objects, and "a", "V1", "b", and "V2" respectively denote the reliability for feature values of the rear surface image of the object, the weight for the feature values of the rear surface image of the object, the reliability for the feature values of the side surface image of the object, and the weight for the feature values of the side surface image of the object.

In this case, the object tracking device 150 may analyze the correlation based on the distance between objects, may recognize the same object based on the analysis result of the correlation, and may allocate the tracking ID to objects recognized, as illustrated in FIG. 6. The object allocating device 156 may allocate the same tracking ID as the tracking ID of the previous object to the relevant object, when the object is determined as an object, which is the same as the object previously recognized. In this case, the object tracking device 150 may track the object based on the tracking ID allocated by the object allocating device 156. Thus, the accuracy in tracking of the object consecutively detected may be improved.

Hereinafter, the operation flow of the vehicle control apparatus according to the present disclosure configured as described above is described in more detail.

Figure 7:
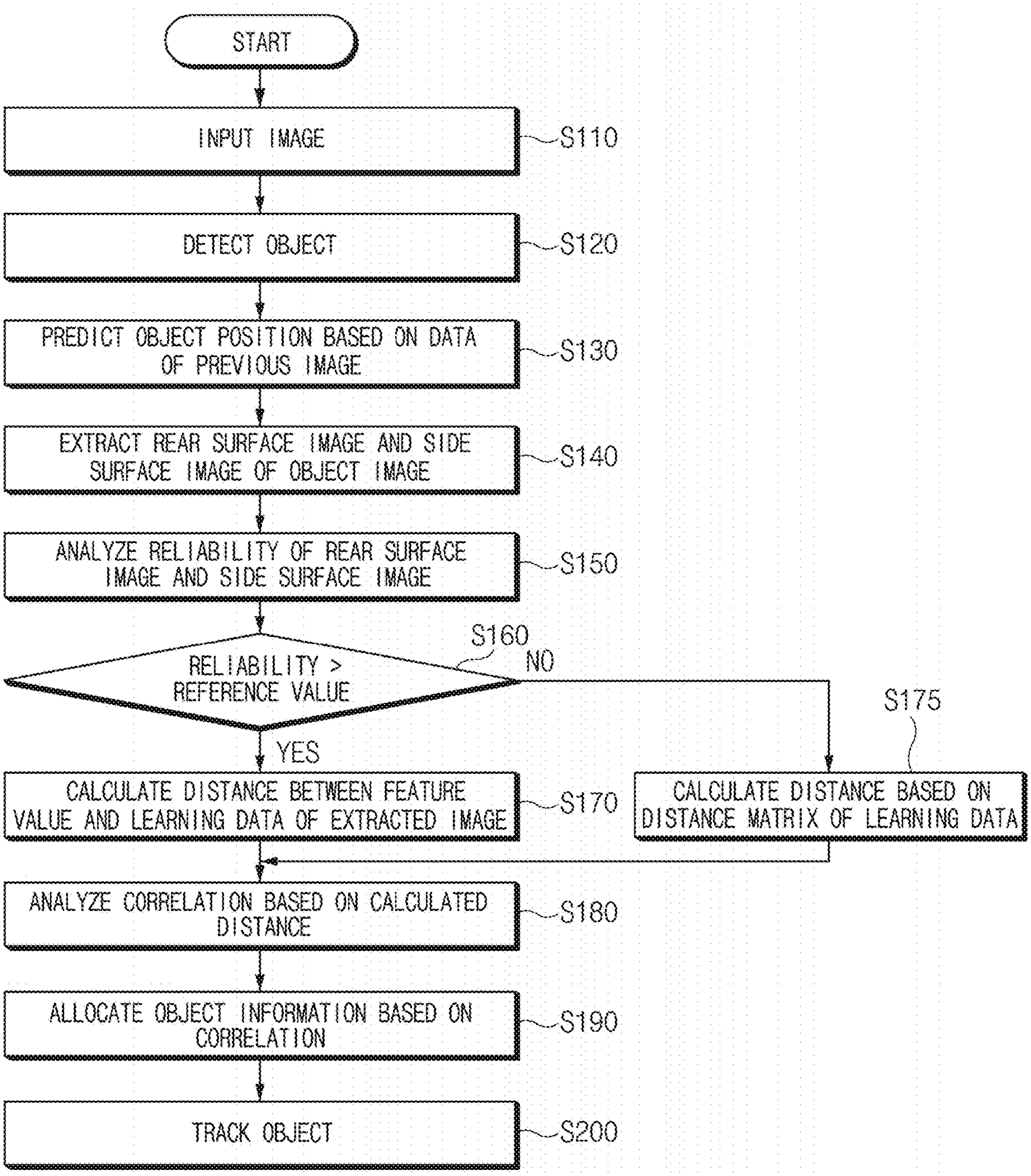
FIG. 7 is a flowchart illustrating operations in a method for controlling a vehicle, according to an embodiment of the present disclosure.

FIG. 7 is a flowchart illustrating operations in a method for controlling a vehicle, according to an embodiment of the present disclosure.

Referring to FIG. 7, when an image is input from the camera (S110), the vehicle control apparatus detects an object from the image input in S110, (S120). The vehicle control apparatus may extract information about the object, for example, information about the bounding box of the object in S120.

The vehicle control apparatus may predict the position of the object from a present image, based on the data of the image previously input (S130). The vehicle control apparatus may extract a rear surface image and a side surface image from the image of the object at the position predicted in S130 (S140).

In this case, the vehicle control apparatus may analyze the reliability for the rear surface image and the side surface image, based on the ratio occupied by the rear surface image and the ratio occupied by the side surface image, based on the bounding box for the whole image of the object (S150).

The vehicle control apparatus may determine whether the reliability determined in S150 exceeds a reference value (S160). When the reliability determined in S150 exceeds the reference value (Yes in S160), the vehicle control apparatus may calculate the distance between the feature value of the relevant image and learning data learned based on the previous image (S170). In this case, the learning data learned based on the previous image may correspond to the feature value of the rear surface image (or the side surface image) of the object trained based on the previous image.

Meanwhile, the vehicle control apparatus calculates the distance based on a distance matrix of the learning data (S175) in place of the feature value of the relevant image, when the reliability for the relevant image determined in S150 is equal to or less than the reference value (No in S160).

In this case, the vehicle control apparatus analyzes the correlation between objects based on the distance calculated in S170 or S175 (S180). The vehicle control apparatus allocates intrinsic information, for example, the tracking ID to each object based on the correlation in S180 (S190). The vehicle control apparatus tracks the object based on the tracking ID of the object allocated in S190 (S200).

Figure 8:
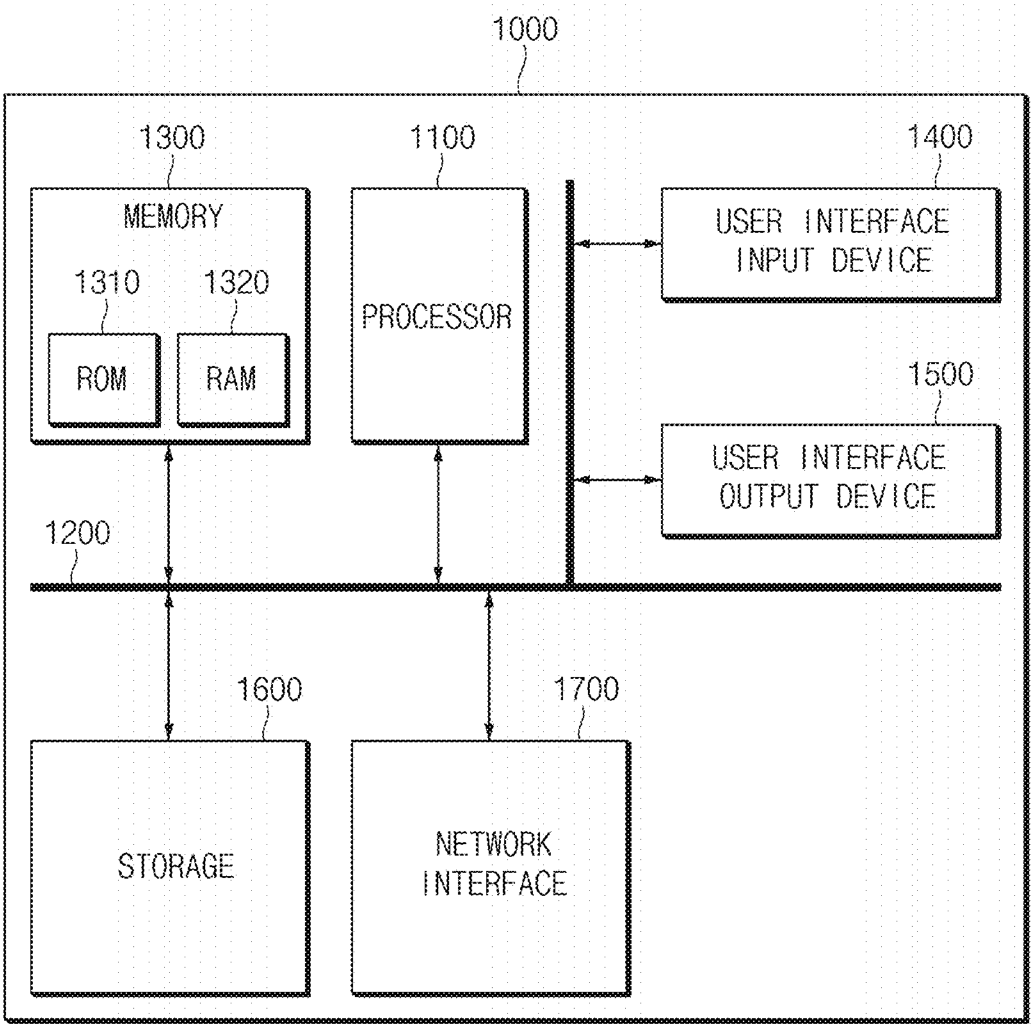
FIG. 8 is a view illustrating a computing system, according to one embodiment of the present disclosure.

FIG. 8 is a view illustrating a computing system, according to one embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, in the vehicle control apparatus and method according to an embodiment of the present disclosure, when the object is recognized based on the image captured by the camera, the rear surface image (front view image) and the side surface image of the object are divided and the reliability for each of the rear surface image (front view image) and the side surface image is calculated. The correlation between objects is analyzed based on the feature values of the reliable image. Thus, the recognition rate of the same object may be increased, and the object tracking performance may be improved. The object recognition data for each of the rear surface image (front view image) and the side surface image of the object is learned. When the unreliable image is recognized, the correlation between objects is analyzed by making reference to the learning data. Thus, the erroneous recognition of the object may be minimized.

According to an embodiment of the present disclosure, the rear surface image (front surface image) and the side surface image of the object may be divided. The reliability for the rear surface image (the front surface image) may be calculated, when recognizing the object based on an image of the object captured by the camera. The correlation between objects based on feature values of a reliable image may be analyzed. Thus, the recognition rate of the same object may be increased and the performance for tracking the object may be improved.

In addition, according to an embodiment of the present disclosure, the object recognition data for the rear surface (front surface image) image and the side surface image of the object may be learned, and the correlation between objects may be analyzed by making reference to learning data, when recognizing an unreliable image to minimize the erroneous recognition of the object.

The above description is merely examples of the technical idea of the present disclosure. Various modifications and modifications may be made by one having ordinary skill in the art without departing from the essential characteristic of the invention.

Therefore, the embodiments of the present disclosure are provided to explain the spirit and scope of the present disclosure and are not intended to limit the spirit and scope of the present disclosure. The scope of protection of the present disclosure should be construed by the attached claims, and all equivalents thereof should be construed as being included within the scope of the present disclosure.

Hereinabove, although the present disclosure has been described with reference to embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

What is claimed is:

1. An apparatus for controlling a vehicle, the apparatus comprising:

a sensor including at least one camera to obtain information about objects positioned around the vehicle; and a processor configured to detect at least one object image from a currently obtained image from the camera, predict a position of each object on the currently obtained image, based on information about objects recognized from a previously obtained image, recognize whether two objects correspond to a same object by analyzing a correlation between two objects based on i) the object image detected at the predicted position in the currently obtained image and ii) a previously recognized object image in the previously obtained image, extract, from a same object image detected at the predicted position, both a first image corresponding to a front surface or a rear surface of the object and a second image corresponding to a side surface of the object, extract, from a same previously recognized object image, both a third image corresponding to the same one of the front surface and the rear surface and a fourth image corresponding to a side surface of the object, and analyze the correlation between the two objects based on at least one of a feature value of the first image, a feature value of the third image, a feature value of the second image, or a feature value of the fourth image, or any combination thereof.

2. The apparatus of claim 1, wherein the processor is further configured to:

calculate a distance value between the feature value of the first image and the feature value of the third image;

calculate a distance value between the feature value of the second image and the feature value of the fourth image; and analyze the correlation between the two objects, based on the calculated distance values.

3. The apparatus of claim 2, wherein the processor is further configured to calculate a Mahalanobis distance between the feature values and analyze the correlation between the two objects.

4. The apparatus of claim 2, wherein the controller processor is further configured to calculate a cosine distance between the feature values and analyze the correlation between the two objects.

5. The apparatus of claim 2, wherein the processor is further configured to:

calculate a proportion of a region, which is occupied by each of the first image and the second image, in a bounding box, which is defined as a rectangular region including the object image, based on the bounding box; and analyze reliability for each of the first image and the second image, based on the calculated proportion.

6. The apparatus of claim 5, wherein the processor is further configured to analyze the correlation between the two objects, based on a feature value of at least one of the first image and the second image, in response to a determination that reliability of the at least one of the first image or the second image exceeds a reference value.

7. The apparatus of claim 5, wherein the processor is further configured to analyze the correlation between the two objects, based on a distance value calculated based on a distance matrix of learning data, which is previously learned, when reliability for at least one of the first image or the second image is equal to or less than a reference value.

8. The apparatus of claim 1, wherein the processor is further configured to:

calculate reliability for a front surface image or a rear surface image and for a side surface image detected from one image of images input from at least two cameras;

calculate reliability for a front surface image or a rear surface image and for a side surface image detected from another image of the images input from the at least two cameras, when the images are input from the at least two cameras; and analyze the correlation between the two objects in the two images, based on a weighted sum calculated based on the calculated reliability.

9. The apparatus of claim 1, wherein the processor is further configured to:

analyze the correlation between the two objects, based on the first image and the second image;

learn object recognition data for recognizing whether the object image detected at the predicted position corresponds to the previously recognized object image; and recognize, from a next image obtained from the camera, whether an object image detected in the next image corresponds to the previously recognized object image, based on the learned object recognition data.

10. The apparatus of claim 1, wherein the processor is further configured to allocate a tracking identity (ID) to an object recognized from the object image, wherein the tracking ID is the same as a tracking ID of an object previously recognized, when the object recognized from the object image has the correlation with the object previously recognized.

11. A method for controlling a vehicle, the method comprising:

obtaining a currently obtained image about objects positioned around the vehicle from at least one camera;

detecting at least one object image from the currently obtained image; and recognizing an object by determining whether two objects correspond to a same object based on an analysis of a correlation between i) the object image detected at the predicted position in the currently obtained image and ii) a previously recognized object image in a previously obtained image, wherein recognizing the object comprises:

extracting from a same object image detected at the predicted position, both a first image corresponding to a front surface or a rear surface of the object and a second image corresponding to a side surface of the object;

extracting, from a same previously recognized object image, both a third image corresponding to the same one of the front surface and the rear surface and a fourth image corresponding to a side surface of the object; and analyzing the correlation between the two objects based on at least one of a feature value of the first image, a feature value of the third image, a feature value of the second image, or a feature value of the fourth image, or any combination thereof.

12. The method of claim 11, wherein analyzing the correlation between the two objects comprises:

calculating a distance value between the feature value of the first image and the feature value of the third image;

calculating a distance value between the feature value of the second image and the feature value of the fourth image; and analyzing the correlation between the two objects, based on the calculated distance values.

13. The method of claim 12, wherein analyzing the correlation between the two objects comprises calculating a Mahalanobis distance between the feature values.

14. The method of claim 12, wherein analyzing the correlation between the two objects comprises calculating a cosine distance between the feature values.

15. The method of claim 14, wherein analyzing the correlation between the two objects comprises:

calculating a proportion of a region, which is occupied by each of the first image and the second image, in a bounding box, which is defined as a rectangular region including the object image, based on the bounding box; and analyzing reliability for each of the first image and the second image, based on the calculated proportion.

16. The method of claim 12, wherein analyzing the correlation between the two objects comprises:

calculating a proportion of a region, which is occupied by each of the first image and the second image, in a bounding box, which is defined as a rectangular region including the object image, based on the bounding box; and analyzing reliability for each of the first image and the second image, based on the calculated proportion.

17. The method of claim 16, wherein analyzing the correlation between the two objects comprises analyzing the correlation between the two objects, based on a feature value of at least one of the first image and the second image, in response to a determination that reliability of the at least one of the first image or the second image exceeds a reference value.

18. The method of claim 16, wherein analyzing the correlation between the two objects comprises analyzing the correlation between the two objects, based on a distance value calculated based on a distance matrix of learning data, which is previously learned, when reliability for at least one of the first image or the second image is equal to or less than a reference value.

19. The method of claim 11, wherein recognizing the object comprises:

calculating reliability for a front surface image or a rear surface image and for a side surface image detected from one image of images input from at least two cameras;

calculating reliability for a front surface image or a rear surface image and for a side surface image detected from another image of the images input from the at least two cameras, when the images are input from the at least two cameras; and analyzing the correlation between the two objects in the two images, based on a weighted sum calculated based on the calculated reliability.

20. The method of claim 11, wherein recognizing the object further comprises allocating a tracking identity (ID) to an object recognized from the object image, wherein the tracking ID is the same as a tracking ID of an object previously recognized, when the object recognized from the object image has the correlation with the object previously recognized.

* * * * *